United States Patent [19]
Halasa et al.

[11] Patent Number: 5,612,436
[45] Date of Patent: Mar. 18, 1997

[54] ISOPRENE-BUTADIENE DIBLOCK RUBBER

[75] Inventors: Adel F. Halasa, Bath; Wen-Liang Hsu, Akron; David J. Zanzig, Uniontown; Paul H. Sandstrom, Tallmadge; Laurie E. Austin, Hartville, all of Ohio

[73] Assignee: The Goodyear Tire & Rubber Company, Akron, Ohio

[21] Appl. No.: 524,666

[22] Filed: Sep. 8, 1995

[51] Int. Cl.$^6$ .................................................. C08F 236/00
[52] U.S. Cl. ..................... 526/337; 524/573; 525/232; 525/236; 525/237; 525/315; 525/331.9
[58] Field of Search ..................... 525/315, 232, 525/236, 237, 331.9; 526/337; 524/573, 495

[56] References Cited

U.S. PATENT DOCUMENTS

| | | | |
|---|---|---|---|
| 3,838,288 | 9/1974 | Stolz et al. | 250/492 |
| 4,562,332 | 12/1985 | Walter et al. | 219/121 EM |
| 4,720,621 | 1/1988 | Langen | 219/121 L |
| 5,117,086 | 5/1992 | Boudot et al. | 219/121.64 |
| 5,227,605 | 7/1993 | Boudot et al. | 219/121.13 |
| 5,430,270 | 7/1995 | Findlan | 219/121.63 |
| 5,448,003 | 9/1995 | Hsu et al. | 526/181 |
| 5,502,126 | 3/1996 | Bell et al. | 526/142 |

FOREIGN PATENT DOCUMENTS

| | | |
|---|---|---|
| 259210A1 | 8/1988 | Germany . |
| 58-93592 | 7/1983 | Japan . |
| 60-149727 | 8/1985 | Japan . |
| 63-33517 | 2/1988 | Japan . |
| 63-130712 | 6/1988 | Japan . |
| 2-199397 | 8/1990 | Japan . |
| WO91/14799 | 10/1991 | WIPO . |

*Primary Examiner*—Edward J. Cain
*Attorney, Agent, or Firm*—Alvin T. Rockhill

[57] ABSTRACT

The subject invention discloses an isoprene-butadiene diblock rubber which is particularly valuable for use in making treads for tires which have improved wear characteristics without compromising traction characteristics or rolling resistance. Said isoprene-butadiene diblock rubber is comprised of (1) a first block which is comprised of repeat units which are derived from 1,3-butadiene and (2) a second block which is comprised of repeat units which are derived from both 1,3-butadiene and isoprene, wherein the repeat units derived from isoprene and 1,3-butadiene in the second block are in an essentially random order, wherein the diblock rubber has a glass transition temperature which is within the range of about −100° C. to about −70° C., and wherein the diblock rubber has a Mooney viscosity which is within the range of about 50 to about 140. In cases where the isoprene-butadiene diblock rubber of this invention is employed in automobile tires it will preferably have a second glass transition temperature which is within the range of about −50° C. to about 0° C. The Mooney viscosity will preferably be within the range of about 80 to about 135 and in the case of oil extended polymers will more preferably be within the range of about 100 to about 130 before oil extension.

56 Claims, No Drawings

5,612,436

1

ISOPRENE-BUTADIENE DIBLOCK RUBBER

BACKGROUND OF THE INVENTION

The replacement cost of tires is one of the major expenses encountered by the trucking industry. Tire replacement cost and frequency is, of course, also of concern to most automobile and light truck owners. In recent years, many modifications have been implemented to improve the treadwear characteristics of tires. However, improvements in tire treadwear characteristics have sometimes been achieved by compromising the traction and/or rolling resistance characteristics of the tire.

In order to reduce the rolling resistance of a tire, rubbers having a high rebound can be utilized in making the tires' treads. Tires made with such rubbers undergo less energy loss during rolling and normally also exhibit improved treadwear characteristics. The traditional problem associated with this approach is that the tire's wet traction and wet skid resistance characteristics are compromised. This is because good rolling resistance which favors low energy loss and good traction characteristics which favor high energy loss are viscoelastically inconsistent properties.

In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads. However, such blends are not totally satisfactory for all purposes.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about −110° C. to −20° C. and exhibit a second glass transition temperature which is within the range of about −50° C. to 0° C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −20° C. and 20° C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene, and butadiene having multiple glass transition temperatures and having an excellent combination of properties for use in making tire treads which comprises: terpolymerizing styrene, isoprene and 1,3-butadiene in an organic solvent at a temperature of no more than about 40° C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur cured rubber composition comprised of, based on 100 parts by weight rubber (phr), (A) about 10 to about 90 parts by weight of a styrene, isoprene, butadiene terpolymer rubber (SIBR), and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about −10° C. to about −40° C. and, further the said bound butadiene structure contains about 30 to about 40 percent 1,2-vinyl units, the said bound isoprene structure contains about 10 to about 30 percent 3,4-units, and the sum of the percent 1,2-vinyl units of the bound butadiene and the percent 3,4-units of the bound isoprene is in the range of about 40 to about 70 percent.

U.S. Pat. No. 5,272,220 discloses a styrene-isoprene-butadiene rubber which is particularly valuable for use in making truck tire treads which exhibit improved rolling resistance and tread wear characteristics, said rubber being comprised of repeat units which are derived from about 5 weight percent to about 20 weight percent styrene, from about 7 weight percent to about 35 weight percent isoprene, and from about 55 weight percent to about 88 weight percent 1,3-butadiene, wherein the repeat units derived from styrene, isoprene and 1,3-butadiene are in essentially random order, wherein from about 25% to about 40% of the repeat units derived from the 1,3-butadiene are of the cis-microstructure, wherein from about 40% to about 60% of the repeat units derived from the 1,3-butadiene are of the trans-microstructure, wherein from about 5% to about 25% of the repeat units derived from the 1,3-butadiene are of the vinyl-microstructure, wherein from about 75% to about 90% of the repeat units derived from the isoprene are of the 1,4-microstructure, wherein from about 10% to about 25% of the repeat units derived from the isoprene are of the 3,4-microstructure, wherein the rubber has a glass transition temperature which is within the range of about −90° C. to about −70° C., wherein the rubber has a number average molecular weight which is within the range of about 150,000 to about 400,000, wherein the rubber has a weight average molecular weight of about 300,000 to about 800,000, and wherein the rubber has an inhomogeneity which is within the range of about 0.5 to about 1.5.

U.S. Pat. No. 5,239,009 reveals a process for preparing a rubbery polymer which comprises: (a) polymerizing a conjugated diene monomer with a lithium initiator in the substantial absence of polar modifiers at a temperature which is within the range of about 5° C. to about 100° C. to produce a living polydiene segment having a number average molecular weight which is within the range of about 25,000 to about 350,000; and (b) utilizing the living polydiene segment to initiate the terpolymerization of 1,3-butadiene, isoprene, and styrene, wherein the terpolymerization is conducted in the presence of at least one polar modifier at a temperature which is within the range of about 5° C. to about 70° C. to produce a final segment which is comprised of repeat units which are derived from 1,3-butadiene, isoprene, and styrene, wherein the final segment has a number average molecular weight which is within the range of about 25,000 to about 350,000. The rubbery polymer made by this process is reported to be useful for improving the wet skid resistance and traction characteristics of tires without sacrificing tread wear or rolling resistance.

U.S. Pat. No. 5,061,765 discloses isoprene-butadiene copolymers having high vinyl contents which can reportedly be employed in building tires which have improved traction, rolling resistance, and abrasion resistance. These high vinyl isoprene-butadiene rubbers are synthesized by copolymerizing 1,3-butadiene monomer and isoprene monomer in an organic solvent at a temperature which is within the range of about −10° C. to about 100° C. in the presence of a catalyst system which is comprised of (a) an organoiron compound, (b) an organoaluminum compound, (c) a chelating aromatic amine, and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and herein the molar ratio of the protonic compound to the organoaluminum compound is within the range of about 0.001:1 to about 0.2:1.

U.S. Pat. No. 5,405,927 discloses an isoprene-butadiene rubber which is particularly valuable for use in making truck tire treads, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3% to about 10% of the repeat units in said rubber are 1,2-polybutadiene units, wherein from about 50% to about 70% of the repeat units in said rubber are 1,4-polybutadiene units, wherein from about 1% to about 4% of the repeat units in said rubber are 3,4-polyisoprene units, wherein from about 25% to about 40% of the repeat units in the polymer are 1,4-polyisoprene units, wherein the rubber has a glass transition temperature which is within the range of about −90° C. to about −75° C., and wherein the rubber has a Mooney viscosity which is within the range of about 55 to about 140.

SUMMARY OF THE INVENTION

By utilizing the isoprene-butadiene diblock polymers of this invention in tire tread compounds treadwear characteristics can be improved without compromising traction or rolling resistance. Since the isoprene-butadiene diblock polymers of this invention do not contain styrene the cost of raw materials can also be reduced. This is because styrene and other vinyl aromatic monomers are expensive relative to the cost of conjugated diene monomers, such as 1,3-butadiene and isoprene.

The subject invention more specifically discloses an isoprene-butadiene diblock rubber which has an excellent combination of properties for use in making automobile tire treads, said isoprene-butadiene diblock rubber being comprised of a butadiene block and an isoprene-butadiene block, wherein said butadiene block has a number average molecular weight which is within the range of about 25,000 to about 350,000, wherein said isoprene-butadiene block has a number average molecular weight which is within the range of about 25,000 to about 350,000, wherein said isoprene-butadiene diblock rubber has a first glass transition temperature which is within the range of about −100° C. to about −70° C., wherein said isoprene-butadiene diblock rubber has a second glass transition temperature which is within the range of about −50° C. to about 0° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order.

The subject invention further discloses an isoprene-butadiene diblock rubber which has an excellent combination of properties for use in making truck tire treads, said isoprene-butadiene diblock rubber being comprised of a butadiene block and an isoprene-butadiene block, wherein said butadiene block has a number average molecular weight which is within the range of about 25,000 to about 350,000, wherein said isoprene-butadiene block has a number average molecular weight which is within the range of about 25,000 to about 350,000, wherein said isoprene-butadiene diblock rubber has essentially one glass transition temperature which is within the range of about −100° C. to about −70° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order.

The subject invention also reveals a process for preparing an isoprene-butadiene diblock rubber which has an excellent combination of properties for use in making tire treads which comprises: (a) polymerizing 1,3-butadiene monomer with a lithium initiator in the substantial absence of polar modifiers at a temperature which is within the range of about 5° C. to about 100° C. to produce a living polybutadiene block having a number average molecular weight which is within the range of about 25,000 to about 350,000; and (b) utilizing the living polybutadiene block to initiate the copolymerization of 1,3-butadiene and isoprene, wherein the copolymerization is conducted in the presence of at least one polar modifier at a temperature which is within the range of about 5° C. to about 70° C. to produce a isoprene-butadiene block which is comprised of repeat units which are derived from 1,3-butadiene and isoprene, wherein the isoprene-butadiene block has a number average molecular weight which is within the range of about 25,000 to about 350,000, wherein said butadiene block has a glass transition temperature which is within the range of about −100° C. to about −70° C., wherein said isoprene-butadiene block has a glass transition temperature which is within the range of about −50° C. to about 0° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order.

The present invention further discloses a pneumatic truck tire having an outer circumferential tread wherein said tread is a sulfur cured rubber composition comprised of, based on 100 parts by weight of rubber, (a) from about 70 to about 95 parts of an isoprene-butadiene diblock rubber, said isoprene-butadiene diblock rubber being comprised of a butadiene block and an isoprene-butadiene block, wherein said butadiene block has a number average molecular weight which is within the range of about 25,000 to about 350,000, wherein said isoprene-butadiene block has a number average molecular weight which is within the range of about 25,000 to about 350,000, wherein said isoprene-butadiene diblock rubber has essentially one glass transition temperature which is within the range of about −100° C. to about −70° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order; and (b) from about 5 to about 30 parts of natural rubber.

The subject invention also reveals a pneumatic truck tire having an outer circumferential tread wherein said tread is a sulfur cured rubber composition comprised of, based on 100 parts by weight of rubber, (a) from about 70 to about 95 parts of an isoprene-butadiene diblock rubber, said isoprene-butadiene diblock rubber being comprised of a butadiene block and an isoprene-butadiene block, wherein said butadiene block has a number average molecular weight which is within the range of about 25,000 to about 350,000, wherein said isoprene-butadiene block has a number average molecular weight which is within the range of about 25,000 to about 350,000, wherein said isoprene-butadiene diblock rubber has essentially one glass transition temperature which is within the range of about −100° C. to about −70° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order; and (b) from about 5 to about 30 parts of high cis-1,4-polybutadiene rubber.

The subject invention also discloses a pneumatic automobile tire having an outer circumferential tread wherein said tread is a sulfur cured rubber composition comprised of, based on 100 parts by weight of rubber, (a) from about 70 to about 95 parts of an isoprene-butadiene diblock rubber, said isoprene-butadiene diblock rubber being comprised of a butadiene block and an isoprene-butadiene block, wherein said butadiene block has a number average molecular weight which is within the range of about 25,000 to about 350,000, wherein said isoprene-butadiene block has a number average molecular weight which is within the range of about 25,000 to about 350,000, wherein said isoprene-butadiene diblock rubber has essentially one glass transition temperature which is within the range of about −100° C. to about −70° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order; and (b) from about 5 to about 30 parts of 3,4-polyisoprene rubber.

The subject invention further reveals a pneumatic automobile tire having an outer circumferential tread wherein said tread is a sulfur cured rubber composition comprised of, based on 100 parts by weight of rubber, (a) from about 70 to about 95 parts of an isoprene-butadiene diblock rubber, said isoprene-butadiene diblock rubber being comprised of a butadiene block and an isoprene-butadiene block, wherein said butadiene block has a number average molecular weight which is within the range of about 25,000 to about 350,000, wherein said isoprene-butadiene block has a number average molecular weight which is within the range of about 25,000 to about 350,000, wherein said isoprene-butadiene diblock rubber has a first glass transition temperature which is within the range of about −100° C. to about −70° C., wherein said isoprene-butadiene diblock rubber has a second glass transition temperature which is within the range of about −50° C. to about 0° C., wherein said isoprene-butadiene diblock polymer has a Mooney ML-4 at 100° C. viscosity which is within the range of about 50 to about 140, and wherein the repeat units derived from isoprene and 1,3-butadiene in the isoprene-butadiene block are in essentially random order; and (b) from about 5 to about 30 parts of high cis-1,4-polybutadiene rubber.

The present invention also discloses a pneumatic automobile tire having an outer circumferential tread wherein said tread is a sulfur cured rubber composition comprised of, based on 100 parts by weight of rubber, (a) from about 70 to about 95 parts of an isoprene-butadiene diblock rubber, said isoprene-butadiene diblock rubber being comprised of a butadiene block and an isoprene-butadiene block, wherein said butadiene block has a number average molecular weight which is within the range of about 25,000 to about 350,000, wherein said isoprene-butadiene block has a number average molecular weight which is within the range of about 25,000 to about 350,000, wherein said isoprene-butadiene diblock rubber has a first glass transition temperature which is within the range of about −100° C. to about −70° C., wherein said isoprene-butadiene diblock rubber has a second glass transition temperature which is within the range of about −50° C. to about 0° C., wherein said isoprene-butadiene diblock polymer has a Mooney ML-4 at 100° C. viscosity which is within the range of about 50 to about 140, and wherein the repeat units derived from isoprene and 1,3-butadiene in the isoprene-butadiene block are in essentially random order; and (b) from about 5 to about 30 parts of natural rubber.

DETAILED DESCRIPTION OF THE INVENTION

The isoprene-butadiene diblock rubber (IBR) of this invention is synthesized by solution polymerization. In the first step of the process of this invention, 1,3-butadiene monomer is polymerized to a molecular weight which is within the range of about 25,000 to about 350,000. The polymerization is carried out in an inert organic medium utilizing a lithium catalyst. This polymerization step is carried out without employing a polar modifier. It is important to conduct this polymerization step in the absence of significant quantities of polar modifiers to attain the desired microstructure and glass transition temperature. For example, the repeat units which are derived from 1,3-butadiene make in the first polymerization step will have a low vinyl microstructure (about 6% to about 10% vinyl). The polybutadiene block make in this step will also have a low glass transition temperature which is within the range of about −100° C. to about −70° C.

The inert organic medium which is utilized as the solvent will typically be a hydrocarbon which is liquid at ambient temperatures which can be one or more aromatic, paraffinic or cycloparaffinic compounds. These solvents will normally contain from 4 to 10 carbon atoms per molecule and will be liquids under the conditions of the polymerization. It is, of course, important for the solvent selected to be inert. The term "inert" as used herein means that the solvent does not interfere with the polymerization reaction or react with the polymers made thereby. Some representative examples of suitable organic solvents include pentane, isooctane, cyclohexane, normal hexane, benzene, toluene, xylene, ethylbenzene and the like, alone or in admixture. Saturated aliphatic solvents, such as cyclohexane and normal hexane, are most preferred.

The lithium catalysts which can be used are typically organolithium compounds. The organolithium compounds which are preferred can be represented by the formula: R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium. Organo monolithium compounds, such as alkyllithium compounds and aryllithium compounds, are usually employed. Some representative examples of preferred organo monolithium compounds that can be utilized include ethyllithium, isopropyllithium, n-butyllithium, secondary-butyllithium, normal-hexyllithium, tertiary-octyllithium, phenyllithium, 2-napthyllithium, 4-butylphenyllithium, 4-phenylbutyllithium, cyclohexyllithium, and the like. Normal-butyllithium and secondary-butyllithium are highly preferred lithium initiators.

The amount of lithium catalyst utilized will vary from one organolithium compound to another and with the molecular weight that is desired for the isoprene-butadiene diblock rubber being synthesized. As a general rule in all anionic polymerizations, the molecular weight (Mooney viscosity) of the polymer produced is inversely proportional to the amount of catalyst utilized. An amount of organolithium initiator will be selected to result in the production of an isoprene-butadiene diblock rubber having a Mooney viscosity which is within the range of about 50 to about 140. As a general rule, from about 0.01 phm (parts per hundred parts by weight of monomer) to 1 phm of the lithium catalyst will be employed. In most cases, from 0.01 phm to 0.1 phm of the lithium catalyst will be employed with it being preferred to utilize 0.025 phm to 0.07 phm of the lithium catalyst.

Normally, from about 5 weight percent to about 35 weight percent of the conjugated diene monomer will be charged into the polymerization medium (based upon the total weight of the polymerization medium including the organic solvent and monomers). In most cases, it will be preferred for the polymerization medium to contain from about 10 weight percent to about 30 weight percent monomers. It is typically more preferred for the polymerization medium to contain from about 20 weight percent to about 25 weight percent monomers.

The 1,3-butadiene will be polymerized at a temperature which is within the range of about 5° C. to about 100° C. The polymerization temperature will preferably be within the range of about 40° C. to about 90° C. to attain the desired microstructure for the block segment. Temperatures within the range of about 60° C. to about 80° C. are most preferred. The microstructure of the polybutadiene block segment being prepared is somewhat dependent upon the polymerization temperature.

The polymerization in the first step of the process is allowed to continue until essentially all of the 1,3-butadiene monomer has been exhausted. In other words, the polymerization is allowed to run to completion. Since a lithium catalyst is employed to polymerize the 1,3-butadiene monomer, a living polybutadiene block segment is produced. The living polybutadiene segment synthesized will have a number average molecular weight which is within the range of about 25,000 to about 350,000.

The living polybutadiene segment will preferably have a molecular weight which is within the range of about 50,000 to about 200,000 and will more preferably have a number average molecular weight which is within the range of about 70,000 to about 150,000.

The second step in the process of this invention involves utilizing the living polybutadiene block segment to initiate the copolymerization of additional 1,3-butadiene monomer and isoprene monomer. This copolymerization is carried out in the presence of at least one polar modifier. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like.

The modifier can also be a 1,2,3-trialkoxybenzene or a 1,2,4-trialkoxybenzene. Some representative examples of 1,2,3-trialkoxybenzenes that can be used include 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene, and 5-propyl-1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl-1,2,4-trimethoxybenzene, and 3,5-dimethyl-1,2,4-trimethoxybenzene. Dipiperidinoethane, dipyrrolidinoethane, tetramethylethylene diamine, diethylene glycol, dimethyl ether and tetrahydrofuran are representative of highly preferred modifiers. U.S. Pat. No. 4,022,959 describes the use of ethers and tertiary amines as polar modifiers in greater detail.

The utilization of 1,2,3-trialkoxybenzenes and 1,2,4-trialkoxybenzenes as modifiers is described in greater detail in U.S. Pat. No. 4,696,986. The teachings of U.S. Pat. No. 4,022,959 and U.S. Pat. No. 4,696,986 are incorporated herein by reference in their entirety. The microstructure of the repeat units which are derived from conjugated diene monomers is a function of the polymerization temperature and the amount of polar modifier present. For example in the polymerization of 1,3-butadiene, it is known that higher temperatures result in lower vinyl contents (lower levels of 1,2-microstructure). Accordingly, the polymerization temperature, quantity of modifier and specific modifier selected will be determined with the ultimate desired microstructure of the polymer segment being synthesized being kept in mind.

In the second step of the process of this invention, the final polymeric segment is synthesized. This is typically carried out by adding the polar modifier, additional 1,3-butadiene and isoprene to the medium containing the living polydiene segment made in the first step. This is accomplished by first adding the modifier to the medium containing the living polybutadiene block and subsequently adding the isoprene, and additional 1,3-butadiene. Additional solvent can also be added, if necessary, to maintain the total amount of monomers and polymer within the polymerization medium within the range of about 5 to about 35 weight percent (based upon the total weight of the polymerization medium including monomers, polymer and solvent). It is desirable to add a sufficient amount of solvent so as to maintain the total amount of polymer and monomers within the range of about 10 to about 30 weight percent and preferably within the range of about 20 to about 25 weight percent, based upon the total weight of the reaction medium.

The repeat units in the final segment are, of course, derived from 1,3-butadiene and isoprene. The isoprene-butadiene block will typically be comprised of from about 10 weight percent to about 60 weight percent repeat units which are derived from isoprene, and from about 40 weight percent to about 90 weight percent repeat units which are derived from 1,3-butadiene. It is normally preferred for the final segment to contain from about 20 to about 50 weight percent repeat units which are derived from isoprene and from about 50 weight percent to about 80 weight percent repeat units which are derived from 1,3-butadiene. It is most preferred for the final segment to contain from about 30 to about 45 weight percent repeat units which are derived from isoprene and from about 55 weight percent to about 70 weight percent repeat units which are derived from 1,3-butadiene.

In the second segment, the distribution of repeat units derived from isoprene and butadiene is essentially random. The term "essentially random" as used herein means lacking a definite pattern. However, it is realized that the concentration of repeat units derived from isoprene and butadiene may vary to some degree from one end to the other end of the block. The repeat units which are derived from isoprene or 1,3-butadiene differ from the monomer from which they were derived in that a double bond was consumed by the polymerization reaction.

The copolymerization of butadiene and isoprene carried out in the second step of this process can be conducted at the same temperature which is used in the synthesis of the first block (the polybutadiene block). In most cases the second polymerization step will be conducted at about the same temperature which is utilized in the first polymerization step. However, the copolymerization can be carried out at a lower temperature which is within the range of about 5° C. to about 70° C. if it is desirable to attain at higher glass transition temperature and vinyl content for the isoprene-butadiene block.

The second polymerization step is normally allowed to continue until the monomers are exhausted. In other words, the copolymerization of 1,3-butadiene and isoprene is allowed to continue until the polymerization reaction is complete. A sufficient quantity of monomers will be utilized to attain a number average molecular weight for the final segment which is within the range of about 25,000 to about 350,000. It is normally preferred for the second segment to have a number average molecular weight which is within the range of 50,000 to 200,000 with number average molecular weights within the range of 70,000 to 150,000 being most preferred.

The ratio of the number average molecular weight of the first segment to the number average molecular weight of the final segment will typically be within the range of about 25/75 to about 75/25. This ratio plays a role in determining the morphology of the polymer and will usually be within the range of about 35/65 to about 65/35. The Mooney ML-4 viscosity at 100° C. of the segmented rubbery polymers of this invention will generally be greater than about 50 and less than about 140. It is normally preferred for the Mooney ML-4 viscosity at 100° C. of the rubbery diblock polymer to be within the range of 80 to 135 with Mooney ML-4 viscosities within the range of 100 to 130 being most preferred for oil extended rubbers before oil extension.

After the copolymerization has been completed, the isoprene-butadiene diblock rubber can be recovered from the organic solvent. The diblock rubber can be recovered from the organic solvent and residue by any means, such as decantation, filtration, centrification and the like. It is often desirable to precipitate the isoprene-butadiene diblock rubber from the organic solvent by the addition of lower alcohols containing from about 1 to about 4 carbon atoms to the polymer solution. Suitable lower alcohols for precipitation of the diblock rubber from the polymer cement include methanol, ethanol, isopropyl alcohol, normal-propyl alcohol and t-butyl alcohol. The utilization of lower alcohols to precipitate the isoprene-butadiene diblock rubber from the polymer cement also "kills" the living polymer by inactivating lithium end groups. After the diblock rubber is recovered from the solution, steam stripping can be employed to reduce the level of volatile organic compounds in the diblock rubber.

There are valuable benefits associated with utilizing the isoprene-butadiene diblock rubbers of this invention in making tire tread compounds. Tire tread compounds can be made using these diblock rubbers without the need to blend additional rubbers therein. However, in many cases, it will be desirable to blend the isoprene-butadiene diblock rubber with one or more additional rubbers to attain the desired performance characteristics for the tire tread compound.

The isoprene-butadiene diblock rubbers of this invention can be compounded utilizing conventional ingredients and standard techniques. For instance, the isoprene-butadiene diblock rubbers will typically be blended with carbon black and/or silica, sulfur, additional fillers, accelerators, oils, waxes, scorch inhibiting agents, coupling agents, and processing aids. In most cases, the isoprene-butadiene diblock rubber will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases at least some carbon black will be utilized in the filler. The filler can, of course, be comprised totally of carbon black. Silica can be included in the filler to improve tear resistance and heat build up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the tread compound blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The IBR containing blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers, and 0 to 1 phr of scorch inhibiting agents.

The isoprene-butadiene diblock rubber containing tire tread compounds of this invention can be used in tire treads in conjunction with ordinary tire manufacturing techniques. Tires are built utilizing standard procedures with the isoprene-butadiene diblock rubber simply being substituted for the rubber compounds typically used as the tread rubber. After the tire has been built with the isoprene-butadiene diblock rubber containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 20 minutes with a cure cycle of about 12 to 18 minutes being most preferred.

By utilizing the isoprene-butadiene diblock polymers of this invention in tire tread compounds treadwear characteristics can be improved without compromising traction or rolling resistance. Since the isoprene-butadiene diblock polymers of this invention do not contain styrene the cost of raw materials can also be reduced. This is because styrene and other vinyl aromatic monomers are expensive relative to the cost of conjugated diene monomers, such as 1,3-butadiene and isoprene.

The isoprene-butadiene diblock rubbers of this invention can be advantageously utilized in both automobile and truck tire tread compounds. As a general rule the isoprene-butadiene diblock rubber utilized in truck tire compounds will have a single glass transition temperature which is within the range of about −100° C. to about −70° C. On the other hand, the isoprene-butadiene diblock rubbers which are employed in making automobile tire tread compounds will normally have a first glass transition temperature which is within the range of about −100° C. to about −70° C. and a second glass transition temperature which is within the range of about −50° C. to about 0° C.

The isoprene-butadiene diblock rubber having two glass transition temperatures can be blended with natural rubber to make tread compounds for passenger tires which exhibit outstanding rolling resistance, traction and tread wear characteristics. The utilization of natural rubber in such blends leads to improved processability. Such blends will normally contain from about 5 to about 30 weight percent natural rubber and from about 70 to about 95% of the isoprene-butadiene diblock rubber having two glass transition temperatures. Such blends will preferably contain from about 20 weight percent to about 30 weight percent natural rubber and about 70 to about 80 weight percent of the isoprene-butadiene diblock rubber.

High performance tires which exhibit very exceptional traction characteristics, but somewhat comprised tread wear, can be prepared by blending the isoprene-butadiene diblock rubber having at least two glass transition temperatures with solution or emulsion styrene-butadiene rubber (SBR). In cases where tread wear is of greater importance than traction, from about 5 to about 30 weight percent high cis-1,4-polybutadiene can be blended with about 70 to about 95 weight percent of the isoprene-butadiene diblock rubber having two glass transition temperatures. Such blends will preferably contain from about 20 weight percent to about 30 weight percent of the high cis-1,4-polybutadiene rubber and from about 70 weight percent to about 80 weight percent of the isoprene-butadiene diblock rubber.

In another scenario, the isoprene-butadiene rubber of this invention having essentially one glass transition temperature can be used to improve the traction, tread wear and rolling resistance of automobile tires made therewith by including 3,4-polyisoprene in the blend. Such a blend will typically contain from about 5 to about 30 weight percent 3,4-polyisoprene and from about 70 to about 95 weight percent of the isoprene-butadiene rubber having essentially one glass transition temperature which is within the range of about −100° C. to about −70° C. Such blends will normally contain from about 20 weight percent to about 30 weight percent of the 3,4-polyisoprene and from about 70 weight percent to about 80 weight percent of the isoprene-butadiene diblock rubber.

The 3,4-polyisoprene employed in such blends can be synthesized by the technique disclosed in U.S. Pat. No. 5,239,023. This technique for producing 3,4-polyisoprene involves: (1) adding a catalyst system which is comprised of (a) an organoiron compound which is soluble in the organic solvent, wherein the iron in the organoiron compound is in the +3 oxidation state, (b) a partially hydrolyzed organoaluminum compound, which was prepared by adding a protonic compound selected from the group consisting of water, alcohols and carboxylic acids to the organoaluminum compound, and (c) a chelating aromatic amine; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1 to a polymerization medium containing isoprene monomer and an organic solvent, and (2) allowing the isoprene monomer to polymerize at a temperature which is within the range of about −10° C. to about 100° C. Another representative example of a 3,4-polyisoprene rubber which can be employed in the automobile tire tread compounds of this invention is sold by Huels AG under the tradename Vestogrip® A6001.

Truck tire tread compounds are typically prepared by blending from about 5 to about 30 weight percent of natural rubber and/or high cis-1,4-polybutadiene with about 70 to about 95 weight percent of the single glass transition temperature version of the isoprene-butadiene diblock rubber of this invention. High cis-1,4-polybutadiene which is suitable for use in such blends can be made by the process described in Canadian Patent 1,236,648. High cis-1,4-polybutadiene rubber which is suitable for employment in such blends is also sold by The Goodyear Tire & Rubber Company as Budene® 1207 polybutadiene rubber and Budene® 1208 polybutadiene rubber.

For purposes of this patent application, polymer microstructures are determined by nuclear magnetic resonance spectrometry (NMR). Glass transition temperatures (Tg) are determined by differential scanning calorimetry at a heating rate of 10° C. per minute and molecular weights are determined by gel permeation chromatography (GPC).

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLES 1–3

In this series of experiments, low Tg/high Tg isoprene-butadiene diblock rubbery elastomers were prepared utilizing the techniques of this invention. The rubbers synthesized in this series of experiments were comprised of a first segment consisting of repeat units which were derived from 1,3-butadiene and a second segment which consisted of repeat units deriving from isoprene and 1,3-butadiene.

The diblock polymers prepared in this series of experiments were synthesized in a one-gallon reactor (3.8 liter) batch polymerization reactor. In the procedure used, 509 grams of a premix solution containing 19.6 percent 1,3-butadiene monomer in hexane was charged into the polymerization reactor. Polymerization was initiated by the addition of 2.1 ml of a 1.02M solution of n-butyllithium (0.15 ml out of this 2.1 ml n-butyllithium was used to scavenge the impurities contained in the premix). The reactor was maintained at a temperature of about 65° C. until essentially complete conversion had been achieved.

At this point, 7.4 ml of a 1.05M solution of ethyl tetrahydrofurfuryl ether (ETE) in hexane was added to reactor. Then, 1,500 grams of a scavenged premix solution containing 19.95 percent isoprene and 1,3-butadiene in hexane was added. The premix monomer solution contained a ratio of isoprene to 1,3-butadiene of 50:50. The polymerization was continued at 65° C. until an essentially complete conversion was attained. Three ml of 1M ethanol solution (in hexane) was added to the reactor to shortstop the polymerization and polymer was removed from the reactor and stabilized with 1 phm of an antioxidant. After evaporating hexane, the resulting polymer was dried in a vacuum oven at 50° C. The ratio of the two segments in this polymer was 25:75. The diblock rubbers with other segment ratios were prepared similarly and are shown in Table I.

The three diblock rubbers synthesized in this series of experiments displayed two glass transition temperatures which were within the ranges of about −94° C. to about −95° C. and about −23° C. and −24° C. The microstructure of the diblock rubbers is also shown in Table I.

The polymerization medium was continuously pushed over form the first reactor to the second reactor where the second premix monomer solution was added at a rate of 150 grams/minute. The second premix monomer solution contained a ratio of isoprene to 1,3-butadiene of 30:70 and had a total monomer concentration of 14 percent in hexane. The temperature of the second reactor was also maintained at 90° C. The residence time for both reactors was set at 1.5 hours. The average monomer conversions were determined to be 94 percent for the first reactor and 97 percent for the second reactor.

The polymerization medium was then continuously pushed over to a holding tank which contained isopropanol (as a shortstop) and an antioxidant. The resulting polymer cement was then steam-stripped and the diblock rubber recovered was dried in a vacuum over at a temperature of 50° C. The polymer was determined to have a glass transition temperature at −89° C. and have a Mooney ML-4 viscosity at 100° C. of 73. It was also determined to have a microstructure which contained 10 percent 1,2-polybutadi-

TABLE I

| Example | Segment Ratio | Tg (°C.) | ML-4 | 1,2-PBd | 1,4-PBd | 1,2-PI | 3,4-PI | 1,4-PI |
|---|---|---|---|---|---|---|---|---|
| 1 | 25:75 | −94, −24 | 100 | 30 | 32 | 3 | 28 | 7 |
| 2 | 50:50 | −95, −23 | 86 | 21 | 52 | 2 | 19 | 6 |
| 3 | 75:25 | −94, −23 | 106 | 14 | 74 | 0 | 8 | 4 |

EXAMPLES 4–6

The procedure described in Examples 1–3 was utilized in these examples except that the ratio of isoprene to 1,3-butadiene in the second monomer premix was changed from 50:50 to 30:70 and no ETE modifier was used to complete the polymerization of monomers for the second segment of the diblock rubbers. The three diblock rubbers synthesized in this series of experiments displayed only one glass transition temperature which was within −89° C. and −94° C. The Tgs, Mooney ML-4 viscosities at 100° C., and microstructures of the resulting diblock rubbers are listed in Table II.

ene units, 73 percent 1,4-polybutadiene units, 15 percent 1,4-polyisoprene units, and 2 percent 1,2-polyisoprene units.

EXAMPLES 8–9

The procedure described in Example 7 was utilized in these experiments to synthesize the diblock low Tg/high Tg IBR-IBRs except that the first premix solution was changed from 1,3-butadiene to a mixture of isoprene and 1,3-butadiene and also a mixed modifiers, N,N,N',N'-tetramethylethylene (TMEDA)/sodium-t-amylate (STA) was charged to

TABLE II

| Example | Segment Ratio | Tg (°C.) | ML-4 | 1,2-PBd | 1,4-PBd | 1,2-PI | 3,4-PI | 1,4-PI |
|---|---|---|---|---|---|---|---|---|
| 4 | 25:75 | −89 | 54 | 7 | 69 | 0 | 1 | 23 |
| 5 | 50:50 | −90 | 53 | 7 | 77 | 0 | 1 | 15 |
| 6 | 75:25 | −94 | 51 | 8 | 83 | 0 | 0 | 8 |

EXAMPLE 7

The diblock 50/50 PBD-(30/70) IBR prepared in this experiment was synthesized in a two-reactor (20 liters for the first reactor and 40 liters for the second reactor) continuous system at 90° C. A premix containing 14 percent 1,3-butadiene in hexane was charged into the first polymerization reactor continuously at a rate of 150 grams/minute. Polymerization was initiated by adding a 0.207M solution of n-butyllithium into the first reactor at a rate of 0.32 grams/minute.

the second reactor at the TMEDA to STA and to n-butyllithium molar ratio of 3:0.5:1. The two diblock rubbers prepared in this series of experiments displayed two glass transition temperatures which were within the ranges of about −77° C. to about −83° C. and about −15° C. to −23° C. The compositions of each segment in these diblock rubbers and their glass transition temperatures, Mooney ML-4 viscosities at 100° C. and microstructures are shown in Table III.

TABLE III

| Ex | Segment Ratio | Composition 1st segment Isopo/Bd | 2nd segment Isop/Bd | Tg (°C.) | Mooney ML-4 | 1,2-PBd | 1,4-PBd | 1,2-PI | 3,4-PI | 1,4-PI |
| --- | --- | --- | --- | --- | --- | --- | --- | --- | --- | --- |
| 8 | 50:50 | 30/70 | 30/70 | −83, −23 | 70 | 30 | 44 | 0 | 8 | 18 |
| 9 | 50:50 | 50/50 | 50/50 | −77, −15 | 51 | 21 | 30 | 4 | 17 | 28 |

EXAMPLES 10–14

The isoprene-butadiene diblock rubbers made in Examples 1 and 6 were then compounded utilizing a standard tire tread test formulation and compared to tire tread formulations made with solution styrene-butadiene rubber, styrene-isoprene-butadiene rubber, and a 50%/50% blend of natural rubber and styrene-butadiene rubber. The tire tread test formulations were made by mixing 100 parts of the rubber being tested with 45 parts of carbon black, 9 parts of process oil, 3 parts of stearic acid, 3 parts of zinc oxide, 1 part of microcrystalline wax, 0.5 parts of paraffine wax, 1 part of a mixed aryl-p-phenylenediamine antioxidant, 2 parts of N-(1,3-dimethyl butyl)-N'-phenyl-p-phenylene diamine, 0.8 parts of N-oxydiethylene benzothiazole-2-sulfenamide, 0.4 parts of diphenyl guanidine, and 1.6 parts of sulfur. In Example 10 the isoprene-butadiene diblock rubber made in Example 1 was included in the formulation and in Example 11 the isoprene-butadiene diblock rubber made in Example 2 was included in the formulation. Examples 12–14 were carried out as comparative examples and included styrene-butadiene rubber, styrene-isoprene-butadiene rubber, and the 50%/50% blend of natural rubber and styrene-butadiene rubber, respectively, as the rubber component.

The physical properties of the compounded tire tread formulations are reported in Table IV.

TABLE IV

| Compound Physical Properties | | | | | |
| --- | --- | --- | --- | --- | --- |
| | Example | | | | |
| | 10 | 11 | 12 | 13 | 14 |
| Rubber Component | IBR | IBR | SBR | SIBR | NR/SBR |
| Rheometer, 150° C. | | | | | |
| ML, dNm | 4.4 | 3.2 | 4.0 | 2.7 | 2.6 |
| MH, dNm | 19.8 | 21.6 | 22.8 | 17.8 | 15.8 |
| ts1, min. | 5.7 | 5.7 | 9.1 | 7.7 | 5.9 |
| T25, min. | 8.4 | 8.6 | 12.5 | 10.4 | 7.7 |
| T90, min. | 16.9 | 13.6 | 20.3 | 18.8 | 14.7 |
| Stress-Strain, 18'/150° C. | | | | | |
| 100% Modulus, MPa | 2.0 | 2.4 | 2.1 | 1.8 | 1.8 |
| 300% Modulus, MPa | 9.4 | 9.3 | 8.2 | 8.8 | 9.0 |
| Break Strength, MPa | 16.4 | 11.7 | 17.0 | 16.1 | 19.9 |
| Elongation at Break | 473% | 380% | 558% | 515% | 554% |
| Rebound | | | | | |
| rebound at 23° C. | 36% | 64% | 52% | 31% | 59% |
| rebound at 100° C. | 65% | 71% | 63% | 64% | 66% |
| DIN Abrasion, cc[1] | 126 | 28 | 71 | 179 | 123 |
| Autovibron, 11 Hz | | | | | |
| tan delta at 0° C. | .392 | .076 | .117 | .368 | .163 |
| tan delta at 60° C. | .065 | .048 | .096 | .100 | .084 |

[1]Reported in cubic centimeters of volume loss.

Table IV shows that the isoprene-butadiene diblock rubbers of this invention exhibit low tan delta values at 60° C. while exhibiting very high tan delta values at 0° C. Low tan delta values at 60° C. are indicative of good rolling resistance when incorporated into tire treads and high tan delta values at 0° C. are indicative of good traction characteristics. Accordingly, tire treads can be made with the isoprene-butadiene diblock rubbers of this invention which have both improved traction characteristics and rolling resistance. Example 10 depicts an excellent tire tread compound for automobile tires which will provide outstanding traction, tread durability and rolling resistance. This is because it exhibits a tan delta at 0° C. of greater than 0.35 while displaying a tan delta at 60° C. of less than 0.070. Such compounds would, of course, be highly desirable in high performance tires.

Such compounds which exhibit large differences between the tan delta value at 0° C. and their tan delta value at 60° C. offer an array of advantages in tire tread compounding applications. For instance, it is generally considered to be good for the difference between tan delta at 0° C. and tan delta at 60° C. to be 0.150 or greater. It is excellent for the difference between tan delta at 0° C. and the tan delta at 60° C. to be 0.2 or greater and it is very exceptional for this difference in tan delta values to be greater than 0.25. In the case of the compound made in Example 10 the difference between tan delta at 0° C. and tan delta at 60° C. is greater than 0.30.

The tire tread compound depicted in Example 11 could be used in truck tires to provide exceptional rolling resistance and tread durability with somewhat compromised traction characteristics. In the case of truck tires traction characteristics are generally not of great concern because of very heavy vehicle weights. Thus, the compound made in Example 11 has good characteristics for truck tires. In any case, the compound depicted in Example 11 displays a tan delta at 60° C. of less than 0.050 which is indicative of superb rolling resistance and treadwear characteristics. As can be seen the tan delta attained at 60° in Example 11 is less than that realized in any of the control compounds. The abrasion resistance observed in Example 11 was outstanding with the DIN abrasion being less than 30 cc. A DIN abrasion of less than 50 cc is considered to be excellent and a DIN abrasion of less than 40 cc is considered to be superb for tire treadwear.

EXAMPLES 15–19

The isoprene-butadiene diblock rubbers made in Examples 8 and 9 were then compounded utilizing a tire tread test formulation and compared to tire tread formulations made with a blend of emulsion styrene-butadiene rubber and high cis-1,4-polybutadiene rubber. The tire tread test formulations were made by mixing the ingredients shown in Table V. Example 15 was carried out as a comparative example and did not included any of the isoprene-butadiene diblock rubber of this invention, as the rubber component.

TABLE V

|  | Example | | | | |
|---|---|---|---|---|---|
|  | 15 | 16 | 17 | 18 | 19 |
| Emulsion SBR[1] | 96.3 | — | — | — | — |
| Cis-1,4-PBD[2] | 37.5 | — | 37.5 | — | 37.5 |
| IBR (Example 8) | — | 100 | 70 | — | — |
| IBR (Example 9) | — | — | — | 100 | 70 |
| carbon black | 93 | 93 | 93 | 93 | 93 |
| wax | 4 | 4 | 4 | 4 | 4 |
| zinc oxide | 4 | 4 | 4 | 4 | 4 |
| stearic acid | 2 | 2 | 2 | 2 | 2 |
| CBS | 3.5 | 3.5 | 3.5 | 3.5 | 3.5 |
| TMTD | 0.25 | 0.25 | 0.25 | 0.25 | 0.25 |
| sulfur | 0.85 | 0.85 | 0.85 | 0.85 | 0.85 |
| Processing Oil | — | 33.8 | 26.3 | 33.8 | 26.3 |
| Antidegradant | 1.5 | 1.5 | 1.5 | 1.5 | 1.5 |

[1]The 96.3 parts of emulsion styrene-butadiene rubber contained 70 parts of rubber and 26.3 parts of processing oil. The emulsion styrene-butadiene rubber contained 23.5% bound styrene.
[2]The 37.5 parts of high cis-1,4-polybutadiene rubber contained 30 parts of rubber and 7.5 parts of processing oil.

The physical properties of the compounded tire tread formulations are reported in Table VI.

TABLE VI

| Compound Physical Properties | | | | | |
|---|---|---|---|---|---|
|  | Example | | | | |
|  | 15 | 16 | 17 | 18 | 19 |
| Rubber Component | SBR/PBD | IBR | IBR/PBD | IBR | IBR/PBD |
| Rheometer, 150° C. | | | | | |
| ML, dNm | 9.1 | 8.9 | 9.2 | 6.3 | 8.0 |
| MH, dNm | 34.8 | 33.2 | 34.1 | 25.8 | 28.0 |
| ts1, min. | 7.5 | 6.2 | 6.2 | 7.0 | 6.5 |
| T25, min. | 10.0 | 9.0 | 7.8 | 8.0 | 7.5 |
| T90, min. | 14.0 | 10.7 | 10.0 | 11.0 | 9.6 |
| Stress-strain, 18'/150° C. | | | | | |
| 100% Modulus, MPa | 1.85 | 1.85 | 1.78 | 1.78 | 1.56 |
| 300% Modulus, MPa | 7.47 | 7.01 | 6.65 | 6.37 | 5.57 |
| Break Strength, MPa | 15.8 | 12.1 | 12.3 | 9.3 | 9.6 |
| Elongation at Break | 596% | 516% | 534% | 461% | 478% |
| Rebound | | | | | |
| rebound at 23° C. | 24% | 24% | 27% | 19% | 22% |
| rebound at 100° C. | 39% | 39% | 41% | 34% | 35% |
| DIN Abrasion, cc | 113 | 135 | 104 | 200 | 145 |

TABLE VI-continued

| Compound Physical Properties | | | | | |
|---|---|---|---|---|---|
|  | Example | | | | |
|  | 15 | 16 | 17 | 18 | 19 |
| Autovibron, 11 Hz | | | | | |
| tan delta at 0° C. | .103 | .105 | .098 | .182 | .122 |
| tand elta at 60° C. | .145 | .140 | .139 | .154 | .143 |

EXAMPLES 20–22

The isoprene-butadiene diblock rubbers made in Example 7 was compounded utilizing two different tire tread test formulations and compared to a tire tread formulation made with a blend of emulsion styrene-butadiene rubber and high cis-1,4-polybutadiene rubber. The tire tread test formulations were made by mixing the ingredients shown in Table VII. Example 20 was carried out as a comparative example and did not included any of the isoprene-butadiene diblock rubber of this invention, as the rubber component.

TABLE VII

|  | Example | | |
|---|---|---|---|
|  | 20 | 21 | 22 |
| IBR (Example 7) | — | 70 | 55 |
| 3,4-polyisoprene | — | — | 15 |
| Emulsion SBR[1] | 96.25 | — | — |
| High cis-1,4-polybutadiene[2] | 37.5 | 37.5 | 37.5 |
| Process Oil | 10 | 36.25 | 36.25 |
| Carbon Black | 70 | 70 | 70 |
| Zinc Oxide | 2 | 2 | 2 |
| Wax | 4 | 4 | 4 |
| Stearic Acid | 2 | 2 | 2 |
| CBS | 1 | 1 | 1 |
| TMTD | 0.3 | 0.3 | 0.3 |
| Sulfur | 1.5 | 1.5 | 1.5 |
| Wingstay ® 100 Antioxidant | 1 | 1 | 1 |

[1]The 96.25 parts of emulsion styrene-butadiene rubber contained 70 parts of rubber and 26.25 parts of processing oil. The emulsion styrene-butadiene rubber contained 23.5% bound styrene.
[2]The 37.5 parts of high cis-1,4-polybutadiene rubber contained 30 parts of rubber and 7.5 parts of processing oil. The high cis-1,4-polybutadiene was Budene ® 1254 polybutadiene rubber.

The physical properties of the compounded tire tread formulations are reported in Table VIII.

TABLE VIII

| Compound Physical Properties | | | |
|---|---|---|---|
|  | Example | | |
|  | 15 | 16 | 17 |
| Rubber Component | SBR/PBD | IBR | IBR/3,4-PI |
| Rheometer, 150° C. | | | |
| ML, dNm | 2.9 | 3.2 | 3.1 |
| MH, dNm | 13.4 | 16.7 | 16.2 |
| ts1, min. | 5.6 | 4.8 | 4.6 |
| T25, min. | 6.5 | 5.3 | 5.1 |
| T90, min. | 15.5 | 8.9 | 8.5 |
| Stress-Strain, | | | |

TABLE VIII-continued

Compound Physical Properties

|  | Example | | |
| --- | --- | --- | --- |
|  | 15 | 16 | 17 |
| 18'/150° C. | | | |
| 100% Modulus, MPa | 1.2 | 1.3 | 1.4 |
| 300% Modulus, MPa | 4.3 | 3.9 | 4.4 |
| Elongation at Break | 785% | 639% | 630% |
| Rebound | | | |
| rebound at 23° C. | 32% | 41% | 35% |
| rebound at 100° C. | 46% | 51% | 51% |
| DIN Abrasion, cc | 107 | 81 | 91 |
| Autovibron, 11 Hz | | | |
| tan delta at 0° C. | .122 | .103 | .186 |
| tan delta at 60° C. | .132 | .106 | .107 |

EXAMPLE 19

In this experiment an isoprene-butadiene diblock polymer having a first block which was comprised of repeat units which were derived from isoprene and 1,3-butadiene and a second block which was also comprised of repeat units which were derived form isoprene and 1,3-butadiene was synthesized. The first isoprene-butadiene block in the polymer made had a low vinyl content and the second block had a high vinyl content.

In this experiment ethyl tetrahydrofurfuryl ether (ETE) was employed as the modifier. In the procedure utilized 830 grams of a silica/molecular sieve/alumina dried premix containing isoprene and 1,3-butadiene in hexane was charged into a one gallon (3.8 liter) reactor. The premix monomer solution contained a ratio of isoprene to 1,3-butadiene of 50:50 and the total monomer concentration was 18.2 percent. The monomer premix solution had been previously scavenged for impurities with a n-butyllithium solution. Polymerization was initiated by the addition of 1.6 ml of a 1.04M solution of n-butyllithium.

The reactor was maintained at a temperature of about 65° C. until essentially complete monomer conversion had been achieved which took about 2.5 hours. Then, 4.2 ml of a 1.0M solution of ETE was added to the polymerization medium and followed by an additional 1620 grams of scavenged monomer premix (the premix had a 50:50 ratio of isoprene to 1,3-butadiene and a concentration of 18.2 percent in hexane). The copolymerization was allowed to continue at 65° C. until all the monomers were consumed which took about 2 hours. The polymerization was shortstopped by the addition ethanol to the polymerization medium and the isoprene-butadiene diblock rubber synthesized was stabilized with 1 phr (parts per hundred parts of rubber) of antioxidant. After evaporating the hexane solvent, the resulting isoprene-butadiene diblock rubber was dried in a vacuum oven at a temperature of 50° C.

The isoprene-butadiene diblock rubber made was determined to have two glass transition temperatures at −80° C. and −31° C. The rubber made was also determined to have a microstructure which contained 24% 1,2-polybutadiene units, 27% 1,4-polybutadiene units, 24% 3,4-polyisoprene units, 24% 1,4-polyisoprene units, and 1% 1,2-polyisoprene units.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An isoprene-butadiene diblock rubber which has an excellent combination of properties for use in making truck tire treads, said isoprene-butadiene diblock rubber being comprised of a butadiene block and an isoprene-butadiene block, wherein said butadiene block has a number average molecular weight which is within the range of about 25,000 to about 350,000, wherein said isoprene-butadiene block has a number average molecular weight which is within the range of about 25,000 to about 350,000, wherein said isoprene-butadiene diblock rubber has essentially one glass transition temperature which is within the range of about −100° C. to about −70° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order.

2. An isoprene-butadiene diblock rubber which has an excellent combination of properties for use in making automobile tire treads, said isoprene-butadiene diblock rubber being comprised of a butadiene block and an isoprene-butadiene block, wherein said butadiene block has a number average molecular weight which is within the range of about 25,000 to about 350,000, wherein said isoprene-butadiene block has a number average molecular weight which is within the range of about 25,000 to about 350,000, wherein said isoprene-butadiene diblock rubber has a first glass transition temperature which is within the range of about −100° C. to about −70° C., wherein said isoprene-butadiene diblock rubber has a second glass transition temperature which is within the range of about −50° C. to about 0° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order.

3. A pneumatic truck tire having an outer circumferential tread wherein said tread is a sulfur cured rubber composition comprised of, based on 100 parts by weight of rubber, (a) from about 70 to about 95 parts of an isoprene-butadiene diblock rubber, said isoprene-butadiene diblock rubber being comprised of a butadiene block and an isoprene-butadiene block, wherein said butadiene block has a number average molecular weight which is within the range of about 25,000 to about 350,000, wherein said isoprene-butadiene block has a number average molecular weight which is within the range of about 25,000 to about 350,000, wherein said isoprene-butadiene diblock rubber has essentially one glass transition temperature which is within the range of about −100° C. to about −70° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order; and (b) from about 5 to about 30 parts of natural rubber.

4. A pneumatic truck tire having an outer circumferential tread wherein said tread is a sulfur cured rubber composition comprised of, based on 100 parts by weight of rubber, (a) from about 70 to about 95 parts of an isoprene-butadiene diblock rubber, said isoprene-butadiene diblock rubber being comprised of a butadiene block and an isoprene-butadiene block, wherein said butadiene block has a number average molecular weight which is within the range of about 25,000 to about 350,000, wherein said isoprene-butadiene block has a number average molecular weight which is within the range of about 25,000 to about 350,000, wherein said isoprene-butadiene diblock rubber has essentially one glass transition temperature which is within the range of about −100° C. to about −70° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order; and (b) from about 5 to about 30 parts of high cis-1,4-polybutadiene rubber.

5. A pneumatic automobile tire having an outer circumferential tread wherein said tread is a sulfur cured rubber composition comprised of, based on 100 parts by weight of rubber, (a) from about 70 to about 95 parts of an isoprene-butadiene diblock rubber, said isoprene-butadiene diblock rubber being comprised of a butadiene block and an isoprene-butadiene block, wherein said butadiene block has a number average molecular weight which is within the range of about 25,000 to about 350,000, wherein said isoprene-butadiene block has a number average molecular weight which is within the range of about 25,000 to about 350,000, wherein said isoprene-butadiene diblock rubber has essentially one glass transition temperature which is within the range of about −100° C. to about −70° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order; and (b) from about 5 to about 30 parts of 3,4-polyisoprene rubber.

6. A pneumatic automobile tire having an outer circumferential tread wherein said tread is a sulfur cured rubber composition comprised of, based on 100 parts by weight of rubber, (a) from about 70 to about 95 parts of an isoprene-butadiene diblock rubber, said isoprene-butadiene diblock rubber being comprised of a butadiene block and an isoprene-butadiene block, wherein said butadiene block has a number average molecular weight which is within the range of about 25,000 to about 350,000, wherein said isoprene-butadiene block has a number average molecular weight which is within the range of about 25,000 to about 350,000, wherein said isoprene-butadiene diblock rubber has a first glass transition temperature which is within the range of about −100° C. to about −70° C., wherein said isoprene-butadiene diblock rubber has a second glass transition temperature which is within the range of about −50° C. to about 0° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order; and (b) from about 5 to about 30 parts of high cis-1,4-polybutadiene rubber.

7. A pneumatic automobile tire having an outer circumferential tread wherein said tread is a sulfur cured rubber composition comprised of, based on 100 parts by weight of rubber, (a) from about 70 to about 95 parts of an isoprene-butadiene diblock rubber, said isoprene-butadiene diblock rubber being comprised of a butadiene block and an isoprene-butadiene block, wherein said butadiene block has a number average molecular weight which is within the range of about 25,000 to about 350,000, wherein said isoprene-butadiene block has a number average molecular weight which is within the range of about 25,000 to about 350,000, wherein said isoprene-butadiene diblock rubber has a first glass transition temperature which is within the range of about −100° C. to about −70° C., wherein said isoprene-butadiene diblock rubber has a second glass transition temperature which is within the range of about −50° C. to about 0° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order; and (b) from about 5 to about 30 parts of natural rubber.

8. A process for preparing an isoprene-butadiene diblock rubber which has an excellent combination of properties for use in making tire treads which comprises: (a) polymerizing 1,3-butadiene monomer with a lithium initiator in the substantial absence of polar modifiers at a temperature which is within the range of about 5° C. to about 100° C. to produce a living polybutadiene block having a number average molecular weight which is within the range of about 25,000 to about 350,000; and (b) utilizing the living polybutadiene block to initiate the copolymerization of 1,3-butadiene and isoprene, wherein the copolymerization is conducted in the presence of at least one polar modifier at a temperature which is within the range of about 5° C. to about 70° C. to produce a isoprene-butadiene block which is comprised of repeat units which are derived from 1,3-butadiene and isoprene, wherein the isoprene-butadiene block has a number average molecular weight which is within the range of about 25,000 to about 350,000, wherein said butadiene block has a glass transition temperature which is within the range of about −100° C. to about −70° C., wherein said isoprene-butadiene block has a glass transition temperature which is within the range of about −50° C. to about 0° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order.

9. An isoprene-butadiene diblock rubber as specified in claim 1 wherein said isoprene-butadiene diblock rubber has a Mooney viscosity at 100° C. which is within the range of about 80 to about 135.

10. An isoprene-butadiene diblock rubber as specified in claim 1 wherein the butadiene block has a number average molecular weight which is within the range of about 50,000 to about 200,000; and wherein the isoprene-butadiene block has a number average molecular weight which is within the range of about 50,000 to about 200,000.

11. An isoprene-butadiene diblock rubber as specified in claim 10 wherein the isoprene-butadiene block is comprised of from about 10 weight percent to about 60 weight percent repeat units which are derived from isoprene, and from about 40 weight percent to about 90 weight percent repeat units which are derived from 1,3-butadiene.

12. An isoprene-butadiene diblock rubber as specified in claim 11 wherein the ratio of the number average molecular weight of the butadiene block to the number average molecular weight of the isoprene-butadiene block is within the range of about 25/75 to about 75/25.

13. An isoprene-butadiene diblock rubber as specified in claim 12 wherein the butadiene block has a number average molecular weight which is within the range of about 70,000 to about 150,000; and wherein the isoprene-butadiene block has a number average molecular weight which is within the range of about 70,000 to about 150,000.

14. An isoprene-butadiene diblock rubber as specified in claim 13 wherein the isoprene-butadiene block is comprised of from about 20 weight percent to about 50 weight percent repeat units which are derived from isoprene, and from about 50 weight percent to about 80 weight percent repeat units which are derived from 1,3-butadiene.

15. An isoprene-butadiene diblock rubber as specified in claim 14 wherein the ratio of the number average molecular weight of the butadiene block to the number average molecular weight of the isoprene-butadiene block is within the range of about 35/65 to about 65/35.

16. An isoprene-butadiene diblock rubber as specified in claim 15 wherein the isoprene-butadiene block is comprised of from about 30 weight percent to about 45 weight percent repeat units which are derived from isoprene, and from about 55 weight percent to about 70 weight percent repeat units which are derived from 1,3-butadiene.

17. An isoprene-butadiene diblock rubber as specified in claim 1 wherein said isoprene-butadiene diblock rubber has a Mooney viscosity at 100° C. which is within the range of about 100 to about 130.

18. An isoprene-butadiene diblock rubber as specified in claim 1 wherein said isoprene-butadiene diblock rubber has a Mooney viscosity at 100° C. which is within the range of about 80 to about 135.

19. An isoprene-butadiene diblock rubber as specified in claim 2 wherein the butadiene block has a number average molecular weight which is within the range of about 50,000 to about 200,000; and wherein the isoprene-butadiene block has a number average molecular weight which is within the range of about 50,000 to about 200,000.

20. An isoprene-butadiene diblock rubber as specified in claim 19 wherein the isoprene-butadiene block is comprised of from about 10 weight percent to about 60 weight percent repeat units which are derived from isoprene, and from about 40 weight percent to about 90 weight percent repeat units which are derived from 1,3-butadiene.

21. An isoprene-butadiene diblock rubber as specified in claim 20 wherein the ratio of the number average molecular weight of the butadiene block to the number average molecular weight of the isoprene-butadiene block is within the range of about 25/75 to about 75/25.

22. An isoprene-butadiene diblock rubber as specified in claim 21 wherein the butadiene block has a number average molecular weight which is within the range of about 70,000 to about 150,000; and wherein the isoprene-butadiene block has a number average molecular weight which is within the range of about 70,000 to about 150,000.

23. An isoprene-butadiene diblock rubber as specified in claim 22 wherein the isoprene-butadiene block is comprised of from about 20 weight percent to about 50 weight percent repeat units which are derived from isoprene, and from about 50 weight percent to about 80 weight percent repeat units which are derived from 1,3-butadiene.

24. An isoprene-butadiene diblock rubber as specified in claim 23 wherein the ratio of the number average molecular weight of the butadiene block to the number average molecular weight of the isoprene-butadiene block is within the range of about 35/65 to about 65/35.

25. Am isoprene-butadiene diblock rubber as specified in claim 24 wherein the isoprene-butadiene block is comprised of from about 30 weight percent to about 45 weight percent repeat units which are derived from isoprene, and from about 55 weight percent to about 70 weight percent repeat units which are derived from 1,3-butadiene.

26. An isoprene-butadiene diblock rubber as specified in claim 2 wherein said isoprene-butadiene diblock rubber has a Mooney viscosity which is within the range of about 100 to about 130.

27. A process as specified in claim 8 wherein said polar modifier is selected from the group consisting of diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, and N-phenyl morpholine.

28. A process as specified in claim 27 wherein said lithium initiator is a monofunctional organolithium compound.

29. A process as specified in claim 28 wherein said monofunctional organolithium compound is selected from the group consisting of methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

30. A process as specified in claim 8 wherein said lithium initiator is selected from the group consisting of normal-butyl lithium and secondary-butyl lithium; and wherein said polar modifier is N,N,N',N'-tetramethylethylenediamine.

31. A pneumatic truck tire as specified in claim 3 wherein said tread is a sulfur cured rubber composition which is comprised of, based on 100 parts by weight of rubber, (a) from about 70 to about 75 parts by weight of the isoprene-butadiene diblock rubber, and (b) from about 25 to about 30 parts of natural rubber.

32. A pneumatic truck tire as specified in claim 31 wherein said tread is a sulfur cured rubber composition which is further comprised of carbon black, at least one antidegradant, at least one processing oil, and zinc oxide.

33. A pneumatic truck tire as specified in claim 32 wherein said tread is a sulfur cured rubber composition which is further comprised of silica.

34. A pneumatic truck tire as specified in claim 4 wherein said tread is a sulfur cured rubber composition which is comprised of, based on 100 parts by weight of rubber, (a) from about 70 to about 75 parts by weight of the isoprene-butadiene diblock rubber, and (b) from about 25 to about 30 parts of high cis-1,4-polybutadiene rubber.

35. A pneumatic truck tire as specified in claim 34 wherein said tread is a sulfur cured rubber composition which is further comprised of carbon black, at least one antidegradant, at least one processing oil, and zinc oxide.

36. A pneumatic truck tire as specified in claim 32 wherein said tread is a sulfur cured rubber composition which is further comprised of silica.

37. A pneumatic automobile tire as specified in claim 5 wherein said tread is a sulfur cured rubber composition which is comprised of, based on 100 parts by weight of rubber, (a) from about 70 to about 75 parts by weight of the isoprene-butadiene diblock rubber, and (b) from about 25 to about 30 parts of 3,4-polyisoprene rubber.

38. A pneumatic automobile tire as specified in claim 37 wherein said tread is a sulfur cured rubber composition which is further comprised of carbon black, at least one antidegradant, at least one processing oil, and zinc oxide.

39. A pneumatic automobile tire as specified in claim 38 wherein said tread is a sulfur cured rubber composition which is further comprised of silica.

40. A pneumatic automobile tire as specified in claim 6 wherein said tread is a sulfur cured rubber composition which is comprised of, based on 100 parts by weight of rubber, (a) from about 70 to about 75 parts by weight of the isoprene-butadiene diblock rubber, and (b) from about 25 to about 30 parts of high cis-1,4-polybutadiene rubber.

41. A pneumatic automobile tire as specified in claim 40 wherein said tread is a sulfur cured rubber composition which is further comprised of carbon black, at least one antidegradant, at least one processing oil, and zinc oxide.

42. A pneumatic automobile tire as specified in claim 41 wherein said tread is a sulfur cured rubber composition which is further comprised of silica.

43. A pneumatic automobile tire as specified in claim 7 wherein said tread is a sulfur cured rubber composition which is comprised of, based on 100 parts by weight of rubber, (a) from about 70 to about 75 parts by weight of the isoprene-butadiene diblock rubber, and (b) from about 25 to about 30 parts of natural rubber.

44. A pneumatic automobile tire as specified in claim 43 wherein said tread is a sulfur cured rubber composition which is further comprised of carbon black, at least one antidegradant, at least one processing oil, and zinc oxide.

45. A pneumatic automobile tire as specified in claim 44 wherein said tread is a sulfur cured rubber composition which is further comprised of silica.

46. A process for preparing an isoprene-butadiene diblock rubber which has an excellent combination of properties for use in making tire treads which comprises: (a) polymerizing 1,3-butadiene monomer with a lithium initiator in the presence of at least one polar modifiers at a temperature which is within the range of about 5° C. to about 100° C. to produce a living polybutadiene block having a number average molecular weight which is within the range of about 25,000 to about 350,000; and (b) utilizing the living polybutadiene block to initiate the copolymerization of 1,3-butadiene and isoprene, wherein the copolymerization is conducted in the presence of at least one polar modifier at a temperature which is within the range of about 5° C. to about 70° C. to produce a isoprene-butadiene block which is comprised of repeat units which are derived from 1,3-butadiene and isoprene, wherein the isoprene-butadiene block has a number average molecular weight which is within the range of about 25,000 to about 350,000, wherein said butadiene block has a glass transition temperature which is within the range of about −100° C. to about −70° C., wherein said isoprene-butadiene block has a glass transition temperature which is within the range of about −50° C. to about 0° C., wherein said isoprene-butadiene diblock polymer has a Mooney ML-4 viscosity at 100° C. which is within the range of about 50 to about 140, and wherein the repeat units derived from isoprene and 1,3-butadiene in the isoprene-butadiene block are in essentially random order.

47. A process as specified in claim 46 wherein said polar modifier is selected from the group consisting of diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, and N-phenyl morpholine.

48. A process as specified in claim 46 wherein said polar modifier is tetrahydrofurfuryl ether.

49. An isoprene-butadiene diblock rubber which has an excellent combination of properties for use in making automobile tire treads, said isoprene-butadiene diblock rubber being comprised of a first isoprene-butadiene block and a second isoprene-butadiene block, wherein said first isoprene-butadiene block has a number average molecular weight which is within the range of about 25,000 to about 350,000, wherein said second isoprene-butadiene block has a number average molecular weight which is within the range of about 25,000 to about 350,000, wherein said isoprene-butadiene diblock rubber has a first glass transition temperature which is within the range of about −100° C. to about −70° C., wherein said isoprene-butadiene diblock rubber has a second glass transition temperature which is within the range of about −50° C. to about 0° C., wherein said isoprene-butadiene diblock polymer has a Mooney ML-4 viscosity at 100° C. which is within the range of about 50 to about 140, and wherein the repeat units derived from isoprene and 1,3-butadiene in the first isoprene-butadiene block and the second isoprene-butadiene block are in essentially random order.

50. An isoprene-butadiene diblock rubber as specified in claim 49 wherein the first isoprene-butadiene block has a number average molecular weight which is within the range of about 50,000 to about 200,000; and wherein the second isoprene-butadiene block has a number average molecular weight which is within the range of about 50,000 to about 200,000.

51. An isoprene-butadiene diblock rubber as specified in claim 50 wherein the first isoprene-butadiene block and the second isoprene-butadiene block are comprised of from about 10 weight percent to about 60 weight percent repeat units which are derived from isoprene, and from about 40 weight percent to about 90 weight percent repeat units which are derived from 1,3-butadiene.

52. An isoprene-butadiene diblock rubber as specified in claim 51 wherein the ratio of the number average molecular weight of the first isoprene-butadiene block to the number average molecular weight of the second isoprene-butadiene block is within the range of about 25/75 to about 75/25.

53. An isoprene-butadiene diblock rubber as specified in claim 52 wherein the first isoprene-butadiene block has number average molecular weights which are within the range of about 70,000 to about 150,000; and wherein the second isoprene-butadiene block has a number average molecular weight which is within the range of about 70,000 to about 150,000.

54. An isoprene-butadiene diblock rubber as specified in claim 53 wherein the first isoprene-butadiene block and the second isoprene-butadiene block are comprised of from about 20 weight percent to about 50 weight percent repeat units which are derived from isoprene, and from about 50 weight percent to about 80 weight percent repeat units which are derived from 1,3-butadiene.

55. An isoprene-butadiene diblock rubber as specified in claim 54 wherein the ratio of the number average molecular weight of the first isoprene-butadiene block to the number average molecular weight of the second isoprene-butadiene block is within the range of about 35/65 to about 65/35.

56. An isoprene-butadiene diblock rubber as specified in claim 2 wherein said isoprene-butadiene diblock rubber has a Mooney viscosity at 100° C. which is within the range of about 100 to about 130.

\* \* \* \* \*